(12) United States Patent
Smith (10) Patent No.: US 8,959,598 B2
(45) Date of Patent: Feb. 17, 2015

(54) WIRELESS DEVICE AUTHENTICATION BETWEEN DIFFERENT NETWORKS

(71) Applicant: BCE Inc., Montreal (CA)

(72) Inventor: Brian Norman Smith, Burlington (CA)

(73) Assignee: BCE Inc., Montreal, Quebec (CA)

( * ) Notice: Subject to any disclaimer, the term of this patent is extended or adjusted under 35 U.S.C. 154(b) by 0 days.

(21) Appl. No.: 13/630,771

(22) Filed: Sep. 28, 2012

(65) Prior Publication Data

US 2013/0047218 A1   Feb. 21, 2013

Related U.S. Application Data (63) Continuation of application No. 11/571,206, filed as application No. PCT/CA2005/001971 on Dec. 23, 2005, now abandoned.

(51) Int. Cl.
  *H04L 29/06* (2006.01)
  *H04W 12/06* (2009.01)

(52) U.S. Cl.
  CPC ............ *H04L 63/06* (2013.01); *H04L 63/18* (2013.01); *H04W 12/06* (2013.01); *H04L 63/0807* (2013.01)
  USPC .......... 726/5; 726/1; 726/2; 726/4; 726/10; 713/155; 713/156; 713/157; 713/168; 713/170; 713/175; 713/176; 380/270; 380/272; 380/273

(58) Field of Classification Search
  USPC .......... 726/10, 1–2, 4–5; 713/155–157, 168, 713/170, 175–176; 380/270, 272–273
  See application file for complete search history.

(56) References Cited

U.S. PATENT DOCUMENTS

| | | | |
|---|---|---|---|
| 6,704,789 B1 | 3/2004 | Ala-Laurila et al. | |
| 6,721,632 B2 | 4/2004 | Fallenstein | |
| 6,898,711 B1 * | 5/2005 | Bauman et al. | 713/185 |
| 7,058,181 B2 * | 6/2006 | Wright et al. | 380/270 |
| 7,171,202 B2 | 1/2007 | Chen et al. | |
| 7,281,137 B1 | 10/2007 | Vitikainen | |
| 7,720,864 B1 * | 5/2010 | Muth et al. | 707/785 |
| 2002/0034301 A1 | 3/2002 | Andersson | |
| 2003/0163733 A1 | 8/2003 | Barriga-Caceres et al. | |
| 2004/0117623 A1 | 6/2004 | Kalogridis et al. | |
| 2004/0172531 A1 | 9/2004 | Little et al. | |
| 2005/0122941 A1 | 6/2005 | Wu et al. | |
| 2005/0144144 A1 | 6/2005 | Graff | |
| 2005/0154909 A1 * | 7/2005 | Zhang et al. | 713/200 |
| 2005/0176473 A1 | 8/2005 | Melpignano | |
| 2006/0002556 A1 | 1/2006 | Paul | |
| 2006/0070116 A1 | 3/2006 | Park | |

OTHER PUBLICATIONS

Ribeiro, et al; "A Roaming Authentication Solution for Wifi using IPSec VPNs with client certificates"; Selected Papers form the TERENA Networking Conference, 2004, 12 pages.

(Continued)

*Primary Examiner* — Josnel Jeudy
(74) *Attorney, Agent, or Firm* — Alexander Anishchenko; Borden Ladner Gervais LLP (57) ABSTRACT

A method and system for roaming between heterogeneous networks. The method involves authenticating a mobile communication device on a first network, and providing the device with a single-use token that can be used to sign on to a second network without requiring conventional re-authentication over the second network.

16 Claims, 9 Drawing Sheets

(56) References Cited

OTHER PUBLICATIONS

Corriente Networks LLC; "WPA Security: An Overview How Elektron Keeps Your Wi-Fi Network Save"; http://www.corriente.net, Oct. 15, 20014, pp. 1-7.
European Patent Application No. 05823837.9 Search Report dated Jan. 9, 2009.
Sun et al., "Fast and Secure Universal Roaming Service for Mobile Internet", IEEE Globecom, Nov. 28-Dec. 2, 2005 proceedings, pp. 2896-2901, XP010879276.
Kim et al., "Improving Cross-Domain Authentication Over Wireless Local Area Networks",Proceedings for First International Conference on Security and Emerging Areas in Communications Networks, IEEE, Sep. 5-9, 2005, pp. 127-138, XP010902878.
Soltwisch, "A Method for Authentication and Key Exchange for Seamless Inter-domain Handovers", IEEE, Networks Nov. 2004, pp. 463-469, XP010778591.
Prasad et al., "Next Generation Communications and Secure Seamless Handover", IEEE, Sept 5-9, 2005, pp. 261-268, XP 010890047.
PCT Patent Application No. PCT/CA2005/001971, International Search Report dated Sep. 21, 2006.

* cited by examiner

WIRELESS DEVICE AUTHENTICATION BETWEEN DIFFERENT NETWORKS

CROSS REFERENCE TO RELATED APPLICATIONS

This application is a continuation application of U.S. patent application Ser. No. 11/571,206, filed May 8, 2009, which is a national phase entry of PCT Application No. CA/2005/001971, filed Dec. 23, 2005, the above applications are expressly incorporated herein by reference in their entirety.

FIELD OF THE INVENTION

The present invention relates generally to wireless communication systems. More particularly, the present invention relates to authentication of wireless devices for access to different wireless networks.

BACKGROUND OF THE INVENTION

With the widespread adoption of wireless communication devices, and the proliferation of Wi-Fi hotspots, or IEEE 802.11 WLANs (Wireless Local Area Networks), there is a growing demand for hybrid mobile communication devices that are capable of operating across networks implementing varied wireless technologies. Mobile communication devices, such as cellular telephones, personal digital assistants, and wireless-enabled laptop computers, are now becoming available with interfaces for multiple wireless networks, such as CDMA (Code Division Multiple Access) 1xRTT (1x Radio Transmission Technology), CDMA EVDO (Evolution-Data Optimized) networks, and Wi-Fi networks.

Generally, a mobile device user must be authenticated to a network prior to gaining access to the network services. Challenge-Handshake Authentication Protocol (CHAP) is a common authentication protocol used to effect such authentication. CHAP uses a three-way handshake to verify the identity of the client or user upon initial link establishment. After the link is established, the authentication server sends a challenge message to the mobile device. Using a shared secret, such as a password, the user device responds with a value calculated using a one-way hash function, such as MD5 (Message-Digest 5). The authentication server checks the response against its own calculation of the expected hash value, using the same shared secret. If the values match, the authentication is acknowledged; otherwise the connection is terminated.

When moving between networks, a handoff must occur, requiring an authentication to the new network. In current hybrid architectures, full authentication is repeated, often requiring the user to re-enter username and password information. Even in systems where the login information is passed directly to the new network, the challenge-based authentication can result in slow handoffs, which may be undesirable from a performance perspective. For example, in voice communications, latencies of greater than about 150 ms are considered unacceptable and may be perceptible to the user.

In addition to the speed of the handoff, the authentication to the second network can pose security risks. It is well recognized that some wireless networks are more secure and trusted than other wireless networks. For example, a CDMA 1xRTT network is generally considered to be more secure than an IEEE 802.11-based Wi-Fi network, due to the broader spectrum availability, and established security practices and policies. In less-secure environments, the known vulnerabilities in conventional authentication protocols, such as CHAP, may be exploited by rogue parties to intercept private information.

Certificate-based techniques, using IPSec VPNs (Internet Protocol Security Virtual Private Networks), to support transparent and more secure roaming have been proposed. A disadvantage of such techniques is that the user must be issued the necessary certificates, such as public and private key certificates, over a separately established secure channel, such as an https (HyperText Transfer Protocol Secure sockets) channel, prior to roaming. The use of temporary authentication identities, such as a Temporary Mobile Subscriber Identity (TMSI), have also been proposed to facilitate roaming to pre-authorized Wi-Fi access points within a cell. While such techniques would permit relatively seamless roaming, they require that the TMSI be provided in advance to each authorized access point.

It is, therefore, desirable to provide a method and system for quickly and securely authenticating to a new network, such as when roaming with a mobile communication device.

SUMMARY OF THE INVENTION

In a first aspect, the present invention provides a method of performing authentication of a wireless mobile communication device on a network. The method comprises providing a token to the mobile communication device over a first network; receiving the token from the mobile communication device over a second network; and authenticating the mobile communication device for access to the second network by verifying the token.

In a second aspect, the present invention provides an authentication system. The authentication system comprises a token generation module to provide a token to a mobile communication device over a first network; and an authenticator to receive the token from the mobile communication device over a second network, to verify a token contents, and to grant the mobile communication device access to the second network based on the verification of the token contents.

In a further aspect, the present invention provides a method for authenticating to a heterogeneous network, comprising: receiving a token over a first network to which a mobile communication device is authenticated; sending the token to an authenticator over a second heterogeneous network; and receiving authorization to access the second network from the authenticator based on a verification of contents of the token.

The present invention also provides a mobile communication device, comprising: means to receive a token over a first network, the token containing credentials for authentication to a second network; and means to forward the token over the second network for authentication.

In yet another aspect, the present invention provides a communications network having authentication functions; comprising: an authentication system having a token generation module to provide a token to a mobile communication device over the communications network; and an authenticator to receive the token from the mobile communication device over a separate network, to verify a token contents, and to grant the mobile communication device access to the separate network based on the verification of the token contents.

In yet another aspect, the present invention provides a communication system, comprising: a mobile communication device; a first network to which the mobile communication device is authenticated; and an authentication system having a token generation module to provide a token to a mobile communication device over the first network; and an authenticator to receive the token from the mobile communication device over a separate network, to verify a token contents, and to grant the mobile communication device access to the separate network based on the verification of the token contents.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for authenticating a mobile communication device on a first network, and providing the device with a token that can be used to sign on to a second network without requiring conventional re-authentication over the second network. In some embodiments, the token used to sign on to the second network can be a single use token.

Figure 1:
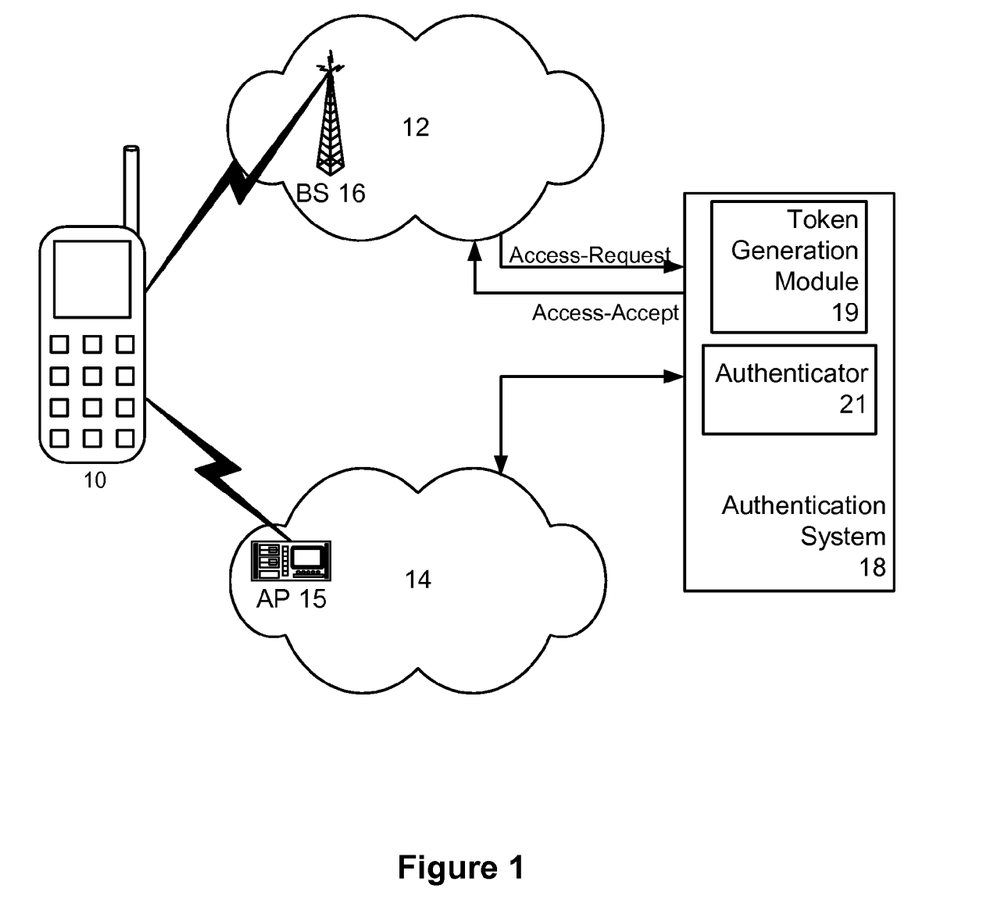
FIG. 1 is a diagram of a heterogeneous wireless communication environment according to some embodiments of the present invention.

FIG. 1 shows a heterogeneous wireless communication environment according to some embodiments of the present invention where a mobile communication device 10 initially authenticates over a first network 12, for example, operating under a first wireless protocol, and roams to a second network 14, for example, operating under a different wireless protocol. The first network 12 is generally a trusted and secure network, operating under such protocols as CDMA2000 1xRTT, W-CDMA (Wireless CDMA), EDGE, CDMA EVDO, or GSM (Global System for Mobile Communications). The second network 14 can be any network different from the first network 12. For example, the second network 14 can be operating under a different protocol than the first, can offer different services, such as voice or data communications, or can be operated by a different service provider. For the purposes of the present description, the second network 14 is a less secure network than the first network. For example, the second network can be a broadband wireless network, such as a WLAN operating under a protocol such as IEEE 802.11, 802.15, 802.16, 802.20 and their variants, a cellular network, or any other network that is different than the first network 12.

The environment depicted in FIG. 1 includes an access point to a broadband wireless network, such as a Wi-Fi access point 15 as the wireless access to the second network 14, a base station 16 as the wireless access to the cellular network 12, and an authentication system 18, which can be included in, for example, an authentication, authorization and accounting (AAA) server. While the following description will illustrate the invention with reference to an AAA server and AAA protocols, any authentication system that includes authentication functions to issue tokens and authenticate a wireless device to a network is encompassed by the present invention. The authentication system need not include accounting features, nor does it need to provide any management functions other than authentication. In addition, the authentication system does not need to be provided in a single server. The authentication functions can be distributed across several servers or applications, and can be wholly or partially operated by third parties distinct from the network service provider. The access point 15 and base station 16 communicate with conventional network elements (not shown), such as switches and routers, to transmit data or voice communications over the first and second networks 12, 14, as appropriate. In a WLAN, access points, or transceivers, such as access point 15, connect mobile devices within the WLAN and also can serve as the point of interconnection between the WLAN, the Internet and a wired network. Each access point can serve multiple mobile devices within a defined network area. As mobile devices move beyond the range of one access point, they are automatically handed over to the next one. A small WLAN may only require a single access point, and the number required increases as a function of the number of mobile devices and the physical size of the WLAN. Similarly, base station 16 is accessible within a defined area, and can be in communication with other radio towers, and with the Internet and conventional wired networks to provide data and telephony services.

Registration, or initialization, of the mobile device 10 to the first network 12 typically involves authentication, authorization and accounting. The AAA server, including authentication system 18, is a server application that handles user requests for access to computer resources and provides AAA services. The authentication system 18 includes a token generation module 19 and an authenticator 21. The AAA server interacts with network access and gateway servers, home and visitor location registers, and databases and directories containing user information, user profiles, billing rates, etc. Common standards by which devices or applications communicate with an AAA server include the Remote Authentication Dial-In User Service (RADIUS), and RADIUS2 or DIAMETER.

RADIUS is an AAA protocol for applications such as network access or IP mobility. It is intended to work in both local and roaming situations. When connecting to a network, the mobile device 10 creates an ACCESS-REQUEST message, typically including a username and password, and passes the ACCESS-REQUEST to a network access server device (not shown) over Point-to-Point Protocol (PPP), then to the authentication system 18. The authentication system 18 receives the ACCESS-REQUEST message and verifies that the server possesses a shared secret for the user. If the authentication system 18 does not possess a shared secret for the user, the request is silently dropped; otherwise, authentication system 18 then authenticates the mobile device 10 using an authentication protocol, such as Password Authentication Protocol (PAP), CHAP, Extensible Authentication Protocol (EAP) or EAPOW (EAP over wireless). If authentication is successful, the authentication system 18 generates an ACCESS-ACCEPT message and transmits it to the mobile device 10 and to the network 12, allowing the device to access network services in accordance with the user's profile, and to initiate voice or data communications. The AAA server is notified when the session starts and stops, so that the user can be billed accordingly; or the usage data can be used for statistical purposes. In some embodiments of the present invention the AAA server also stores information, accessible to, or stored directly within, the authentication system 18, regarding other networks, such as second network 14, to which the mobile subscriber can connect.

Figure 2:
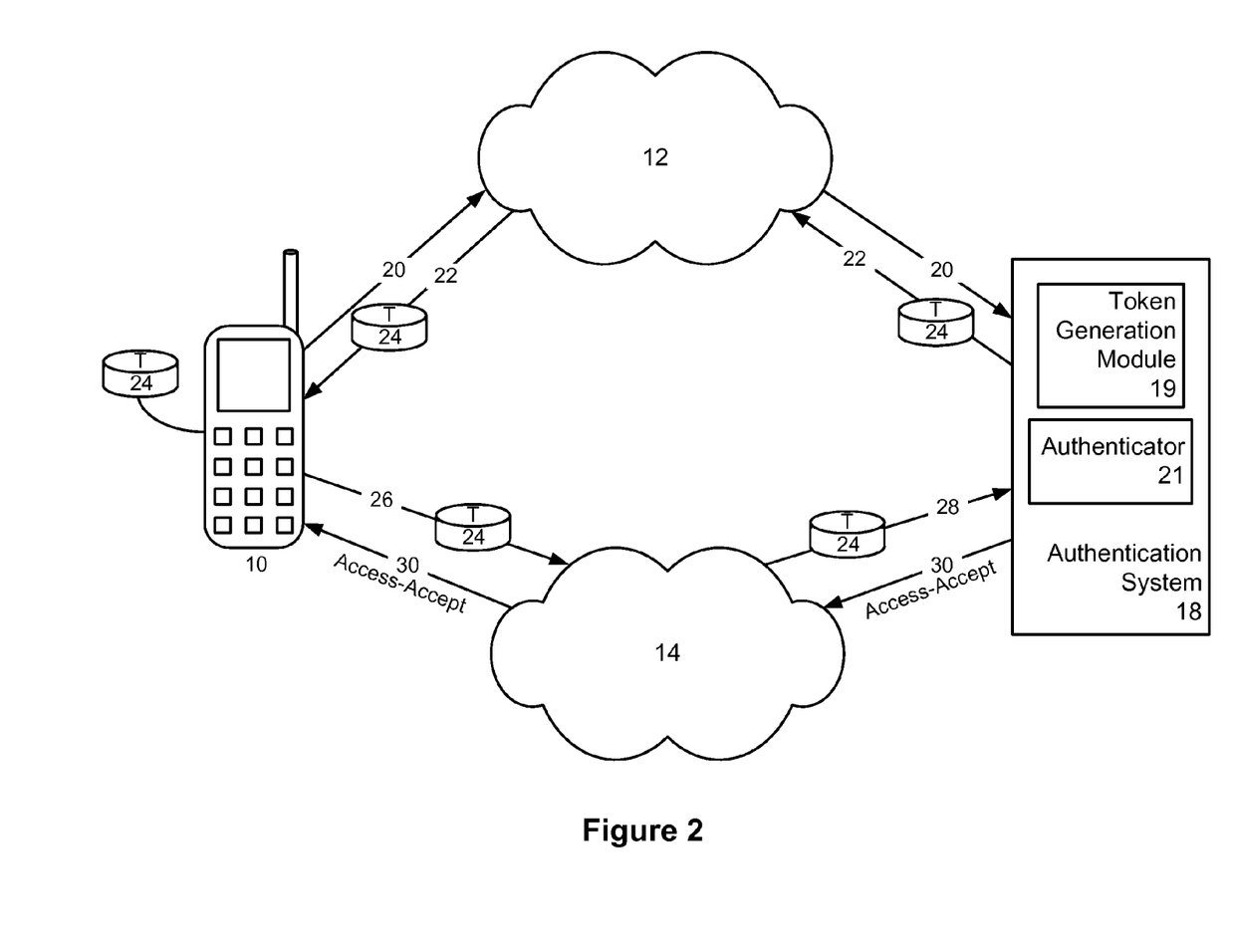
FIG. 2 shows a system for effecting handoff between wireless networks, according to a first embodiment.
Figure 3:
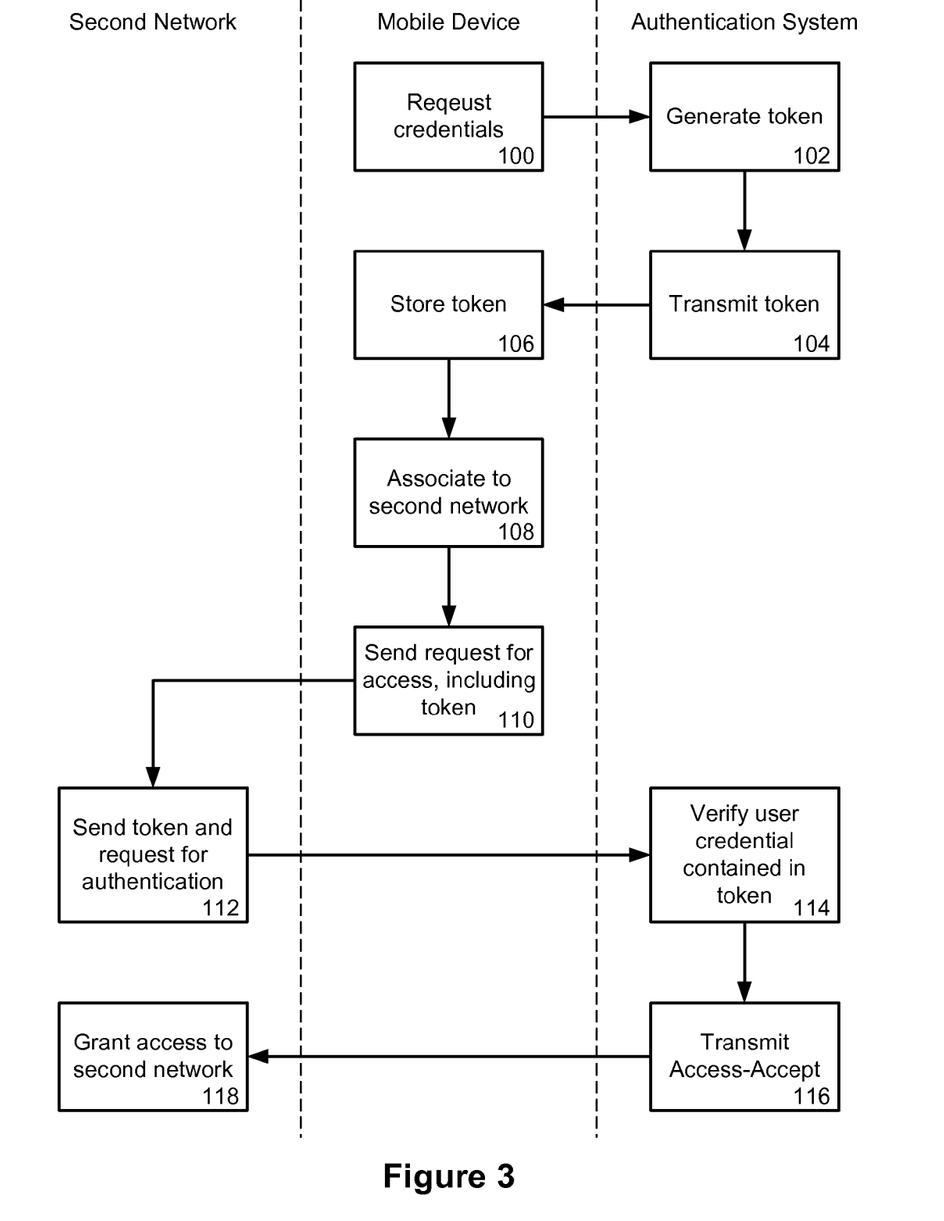
FIG. 3 is a flow chart of a method for authentication and handoff according to the first embodiment.

When the mobile device 10 moves into an area served by the second network 14, it needs to authenticate to the authenticator 21 over the new network in order to maintain the voice or data communication. FIGS. 2 and 3 illustrate a first embodiment of a system and method for providing authentication to the second network 14 through the first network 12. The authentication to the second network 14 can be followed by a handoff to the second network 14. FIG. 2, and subsequent system figures, are simplified representations showing the data flow between the mobile device 10, the first and second networks 12, 14, and the authentication system 18. Network elements, such as access point 15 and base station 16, are not shown. However, as will be understood by those of skill in the art, communications between the authentication system 18 and the mobile device 10 are physically transmitted between elements appropriate to the given network, as exemplified above.

Referring to FIGS. 2 and 3, the method commences after the mobile device 10 is authenticated in a conventional manner, as described above, to the first network 12, and desires to access the second network 14. The decision to access the second network 14 can be based on many factors, including location, signal strength, availability, cost, a desire to access services not provided by the first network, etc., as will be understood by those of skill in the art. In one embodiment, the mobile device 10 sends (100) a request 20 to the authentication system 18, requesting credentials for logging in to the second network 14. The token generation module 19 of the authentication system 18 generates (102) a token 24, that includes the credentials required to authenticate the mobile device 10 to the second network 14, and sends (104) a response 22, including the token 24, back to the mobile device 10, over the first network 12. The token 24 is then stored (106) in the mobile device 10. The mobile device 10 can request credentials for access to the second network 14 at the time it desires to access the network, or can request the credentials in advance, and store the token for future use. The second network 14 can be any network, and does not need to be the next network that the device 10 desires to access. In a further embodiment, the authentication system 18 can generate and transmit the token 24 to the mobile device 10 automatically at initialization once the device 10 is authenticated, or at any other time during the device's connection to the first network 12, obviating the need for request 20.

When the mobile device associates (108) with the second network 14, it sends (110) a message 26, including identification information and the token 24, requesting access to the second network 14. The second network 14 sends a message 28 to the authenticator 21 of the authentication system 18, requesting (112) authentication of the mobile device 10. Message 28 includes the token 24, and will also typically include the mobile device identification information and information identifying the second network. The authentication system 18 verifies (114) the information contained in the token 24, based on the content of message 28, and a shared secret or other key known to the authentication system 18. If the verification is successful, the mobile device 10 is authenticated, and the authentication system 18 sends (116) an ACCESS-ACCEPT message 30 back through network 14 to the mobile device 10, thereby granting access (118) to the second network 14 and completing the authentication. If the token fails to generate an ACCESS-ACCEPT message, mobile device 10 can proceed to authenticate to the second network using conventional authentication methods such as CHAP, PAP, EAP or EAPOW.

Once access to the second network 14 has been granted, the user can be handed off to the second network 14 and terminate his connection to the first network 12, or can remain logged into two or more networks to, for example, access different services, such as voice and data services. Connection to multiple networks is, for example, enabled under the IPv6 communication protocol.

The content of token 24 depends on the network to be accessed and the relevant protocols in operation on the first and second networks. Typically, each token will include a username, password and protocol identification. To provide adequate security and avoid third party interception, some, or all, of this information can be encrypted or hashed, using any appropriate encryption scheme based on public and/or private key infrastructures, or hash functions, such as MD5, and SHA (Secure Hash Algorithm), with a key known to the authentication system 18. The token can also include, or be associated to, encryption keys necessary for establishing and ensuring a secure communication channel between the mobile device and the second network. The token can be a single use token, or can be used multiple times, or a predetermined number of times, by the mobile communication device to access the second network. To provide additional security, the token can also be set to expire at a predetermined time, such as to avoid its use by any party outside a given window, or based on time paid for on the first and/or second networks, as in a pay per use telephone. Token expiry can also be based on number of uses of the token, or the number of times the user has accessed the second network. In this case, the security key associated to the token can be systematically changed. The token 24 also includes, for example in its header, address information for the authentication system 18, to permit the second network 14 to identify authentication system 18. As will be noted, token 24 is not opened, decrypted or verified until it is received at the authentication system 18, and is merely passed through mobile device 10 and second network 14.

Figure 4:
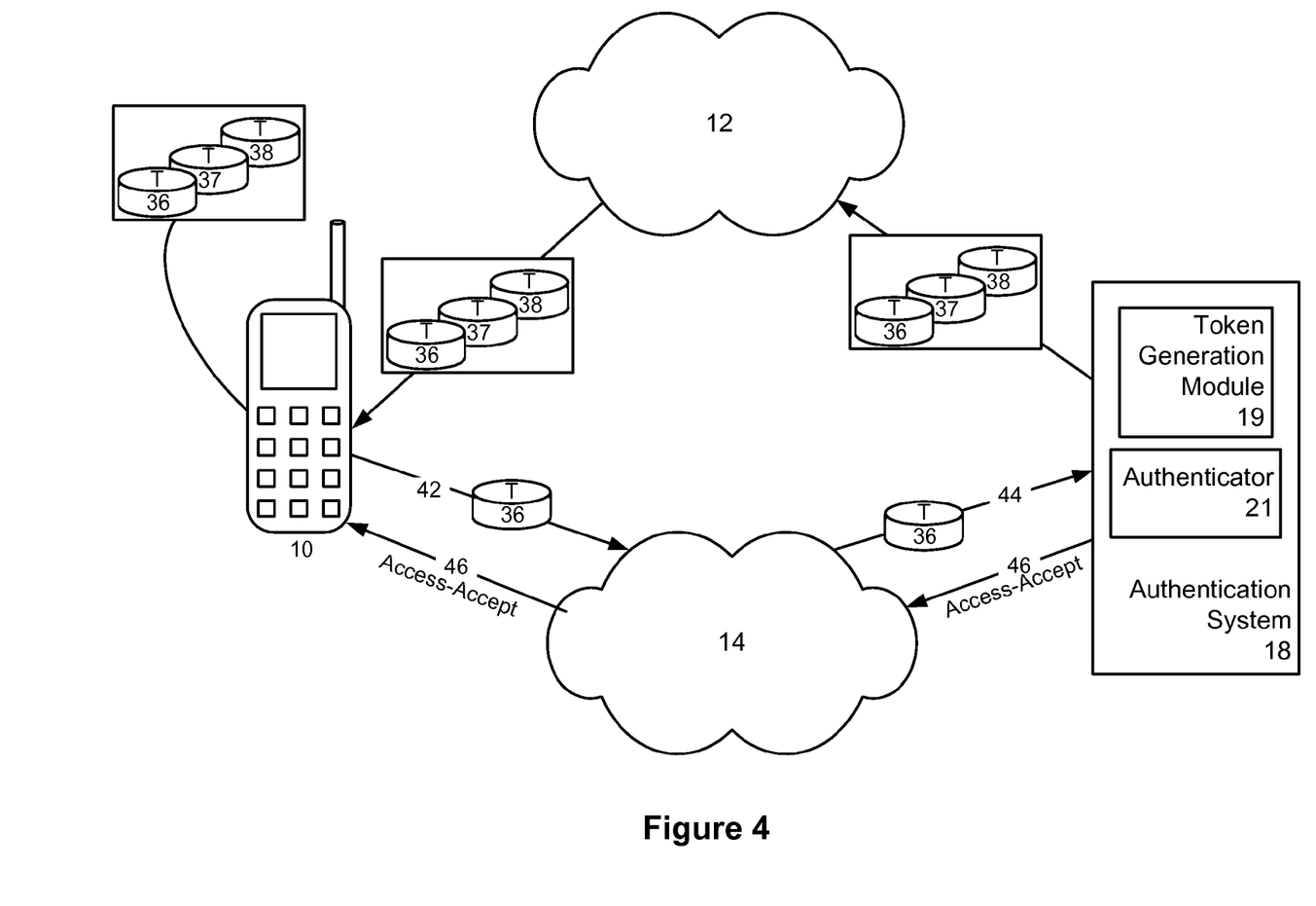
FIG. 4 shows a system for effecting handoff between wireless networks, according to a second embodiment.
Figure 5:
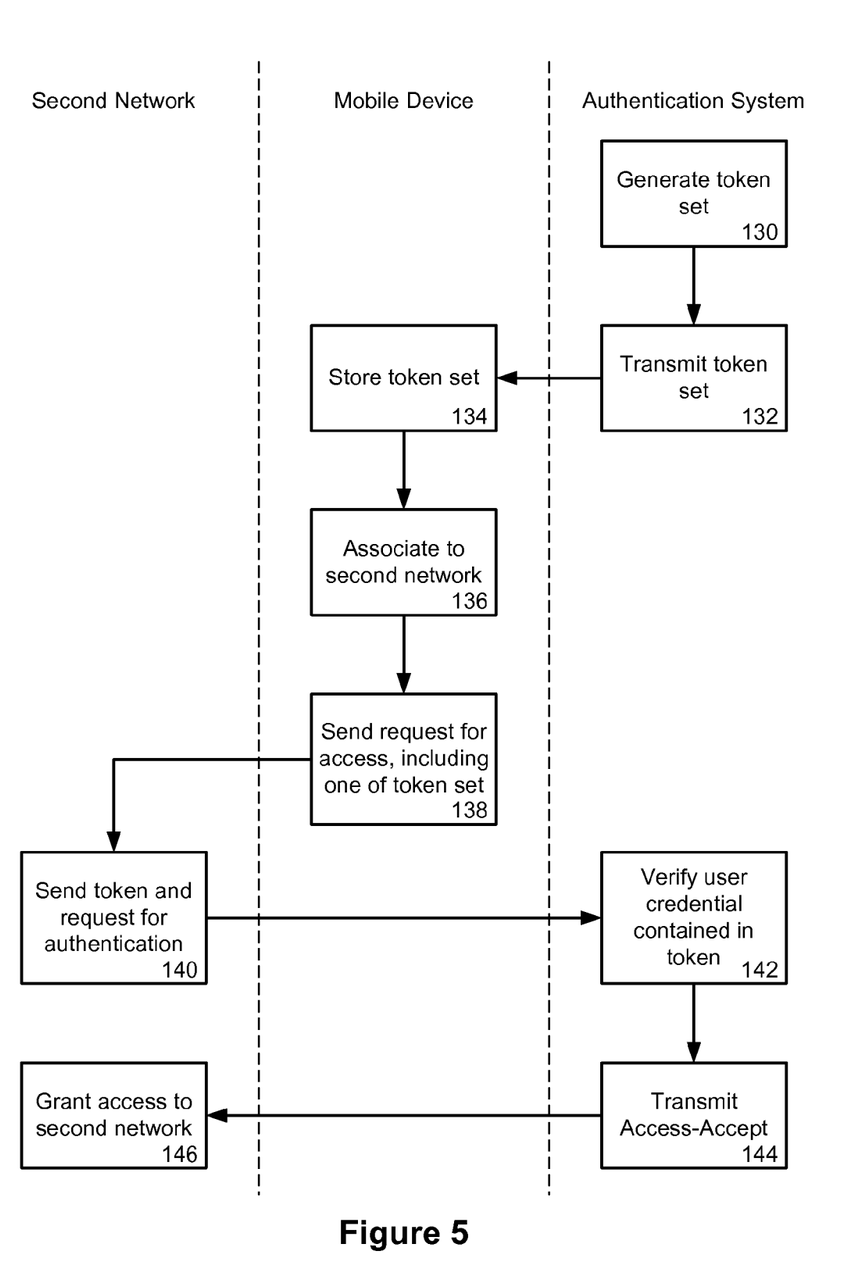
FIG. 5 is a flow chart of a method for authentication according to the second embodiment.

FIGS. 4 and 5 illustrate a second embodiment in which multiple tokens are provided to the mobile device 10. The method again commences after the mobile device 10 is authenticated in a conventional manner to the first network 12. A set of tokens 36, 37, 38 is generated (130) by the authentication system 18, and transmitted (132) to the mobile device 10, either at the request of the mobile device or automatically upon initialization. The number of tokens can be any number, but for the purposes of illustration a set of three tokens is shown. The tokens 36, 37, 38 can be, for example, for access to different networks, valid at different times (i.e. have different expiry times), or otherwise differentiated. The information necessary to differentiate between the tokens can be included in their headers. The tokens 36, 37, 38 are then stored (134) in the mobile device 10 for use during the current communication session. Supplying a set of tokens avoids the need for multiple requests by the mobile device and multiple token generation steps by the AAA server.

When the mobile device associates (136) with the second network 14, it sends (138) a message 42, including identification information and one of the tokens 36, 37, 38, such as token 36, requesting access to the second network 14. The choice of the appropriate token to send can be based on, for example, the identity of network 14, the current time, the services available on the network, such as voice or data services, the amount of time paid for on the network, the number of times the network has been previously accessed by the mobile communications device 10, or a predefined network access order. Alternately, the tokens 36, 37, 38 can be used in order. The second network 14 sends a message 44 to the authentication system 18, requesting (140) authentication of the mobile device 10. Message 44 includes the token 36, and will also typically include the mobile device identification information and information identifying the second network. As before, the authentication system 18 verifies (142) the information contained in the token 36, based on the content of message 44, and a shared secret or other key known to the authentication system 18. If the verification is successful, the mobile device 10 is authenticated, and the authentication system 18 sends (144) an ACCESS-ACCEPT message 46 to the mobile device 10 granting access (146) to the second network 14 and completing the authentication process.

If the mobile device enters into an area served by another recognized network, a subsequent token can be used to authenticate to that network, without going back to the authentication system 18 for a new token. Subsequent tokens can also be used if a token expires and the user wants to continue accessing second network 14, or if the user wishes to re-authenticate to the first network 12. In the later embodiment the user may wish to re-authenticate to the first network 12 to obtain further tokens for future use. Similarly, if a first token fails to generate an ACCESS-ACCEPT message, a second token can be tried. If all tokens fail, the mobile device can fall back to standard authentication through an authentication protocol such as CHAP.

Figure 6:
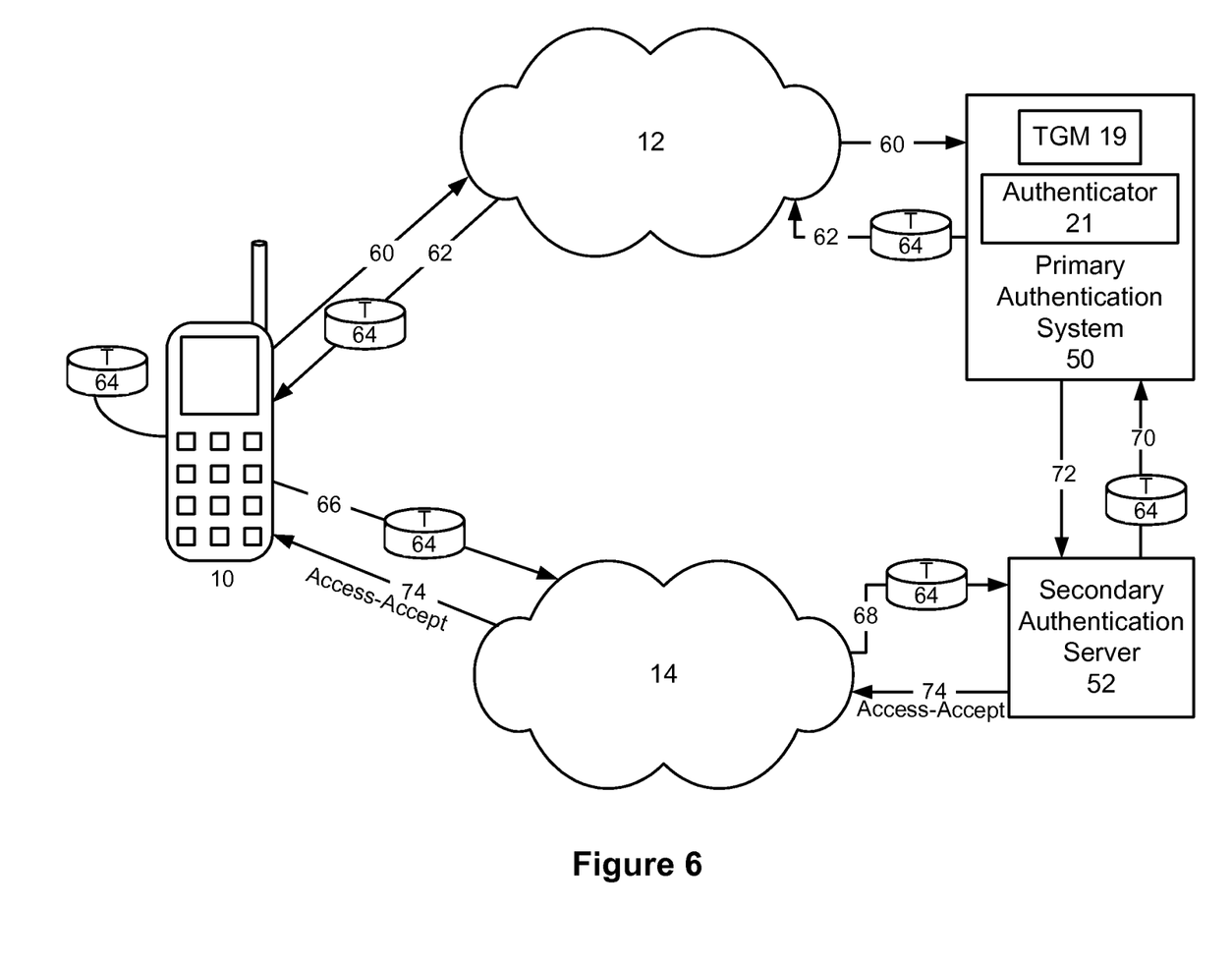
FIG. 6 shows a system including a primary authentication system and a secondary authentication server according to an embodiment of the present invention.
Figure 7:
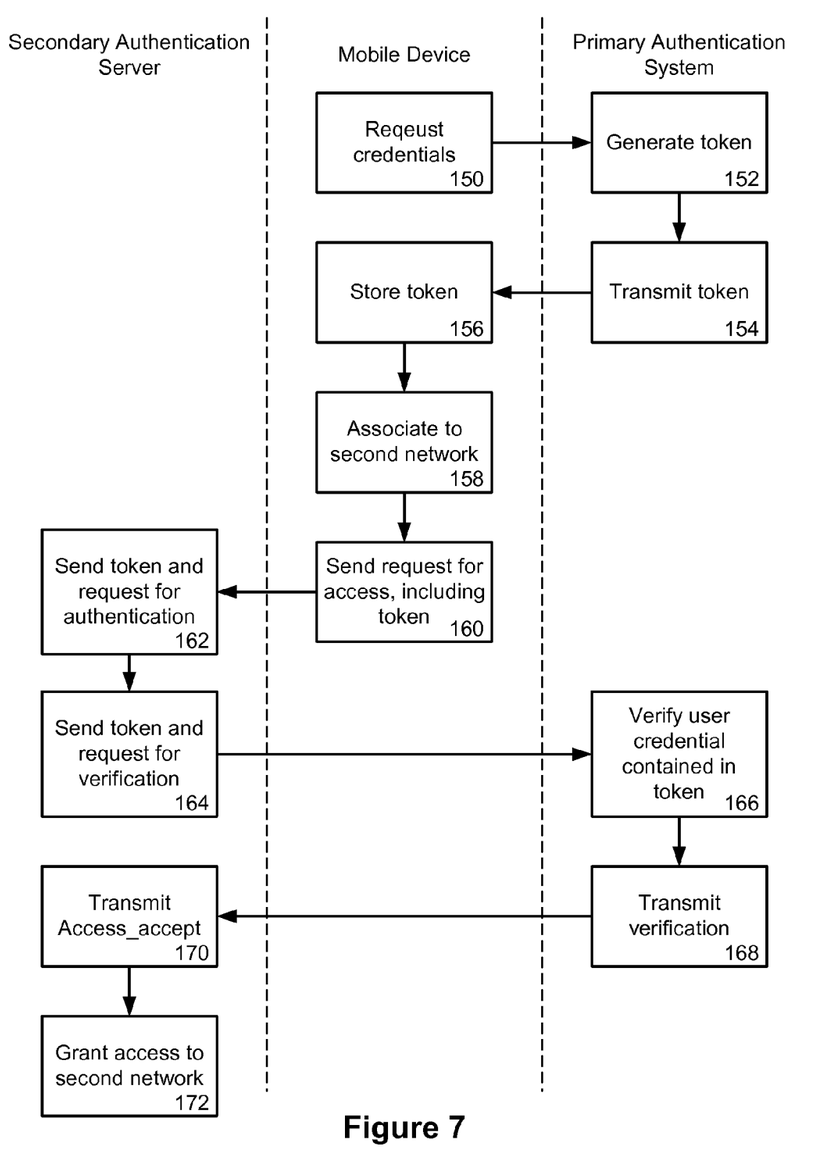
FIG. 7 is a flow chart of a method for authentication using the system of FIG. 6.

FIGS. 6 and 7 illustrate a further embodiment in which a primary authentication system 50 services the first network 12, while a secondary authentication server 52 provides authentication functions for the second network 14. The method commences after the mobile device 10 is authenticated in a conventional manner to the first network 12. The mobile device 10 sends (150) a request 60 to the primary authentication system 50, requesting credentials for logging in to the second network 14. The token generation module 19 of the primary authentication system 50 generates (152) a token 64, that includes the credentials required to authenticate the mobile device 10 to the second network 14, and sends (154) a response 62, including the token 64, back to the mobile device 10, over the first network 12. The token 64 is then stored (156) in the mobile device 10. When the mobile device associates (158) with the second network 14, it sends (160) a message 66, including identification information and the token 64, requesting access to the second network 14.

The second network 14 sends a message 68 to the secondary authentication server 52, requesting (162) authentication of the mobile device 10. Message 68 includes the token 64, and will also typically include the mobile device identification information. The secondary authentication server 52 contacts the primary authentication system 50, and sends it (164) a message 70 containing the token 64 and a request for verification. The secondary authentication server 52 can have independent knowledge of the contact information for the authentication system 18, or the contact information can be included in the token 64, such as in its header. The authentication system 18 verifies (166) the information contained in the token 64, based on a shared secret or other key known to the primary authentication system 50. If the verification is successful, primary authentication system 50 returns (168) a successful verification message 72 to the secondary authentication server 52. The secondary authentication server 52 then authorizes the mobile device 10 for access to the second network, and sends (170) an ACCESS-ACCEPT message 74, to the mobile device 10, granting access (172) to the second network 14 and completing the authentication process.

Figure 8:
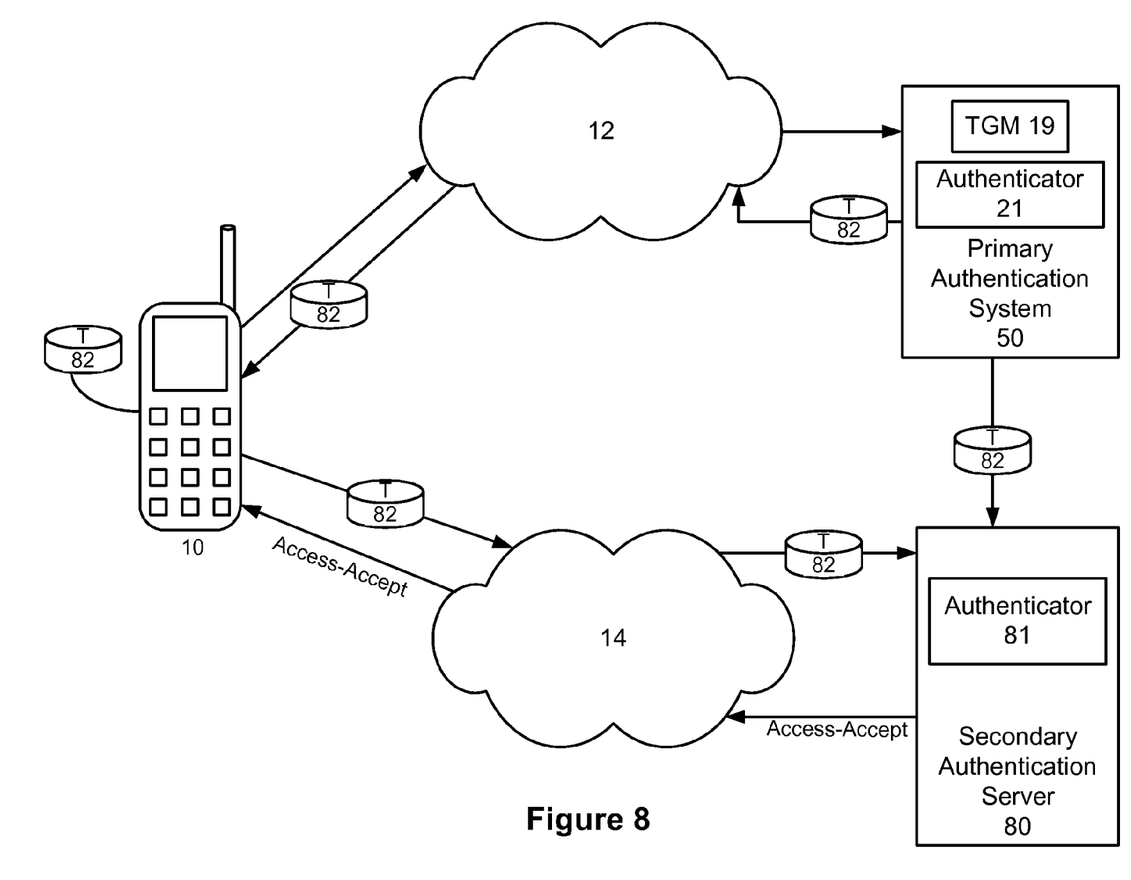
FIG. 8 shows a system in which a secondary authentication server includes an authenticator according to the present invention.
Figure 9:
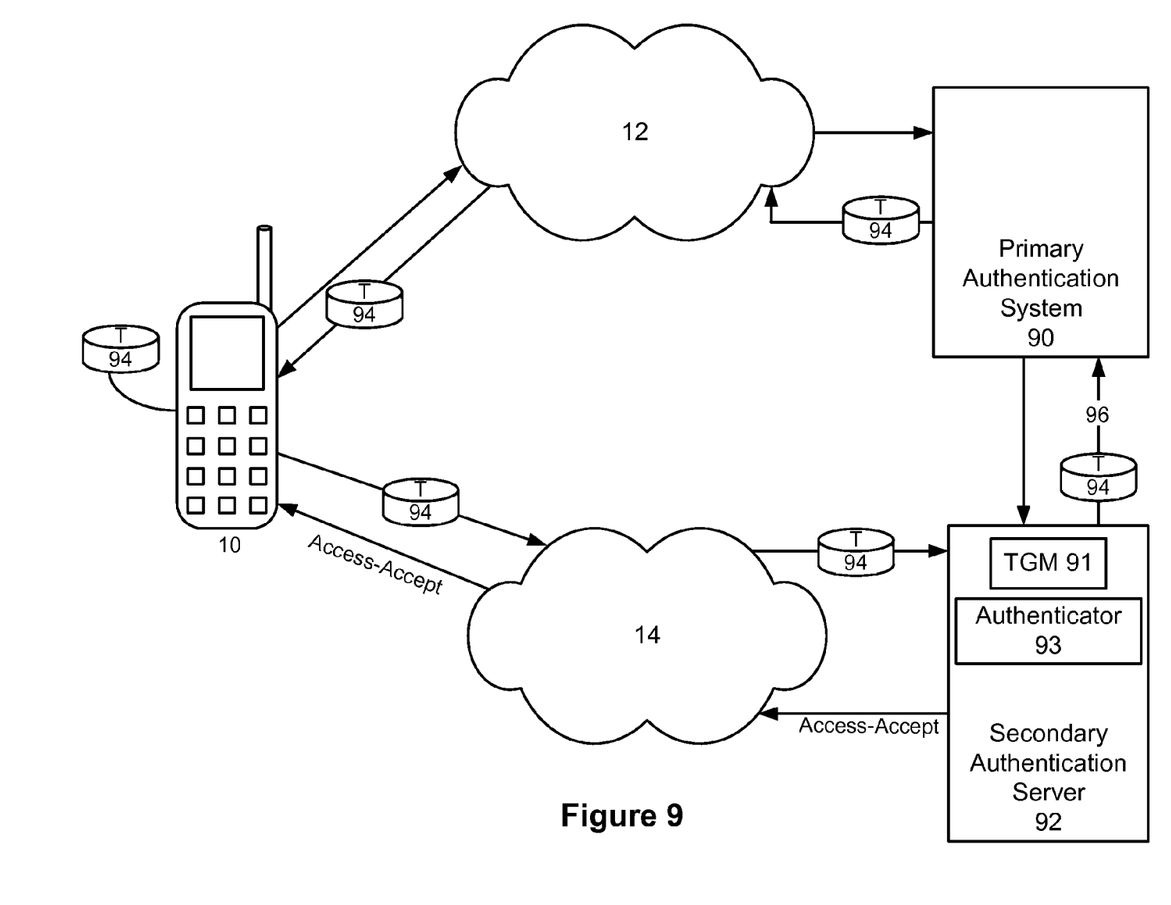
FIG. 9 shows a system in which a secondary authentication server includes an authenticator and a token generation module according to the present invention.

In further embodiments, shown in FIGS. 8 and 9, the secondary authentication server can include an authenticator, or can include a fully enabled authentication system, as described above. In such cases, the authentication functions of the present invention can be distributed. In FIG. 8, the secondary authentication server 80 includes at least an authenticator 81. The mobile device 10 requests credentials, and receives a token 82, from the primary authentication system 50. The primary authentication system 82 also provides the token 82, or the encryption key associated with the token, to the secondary authentication server 80. The mobile device 10 then requests access to the secondary network 14 and provides the token 82. The authenticator 81 of the secondary authentication server 80 then verifies the token, as described above, and authorizes the mobile device 10 for access to the second network 14.

In the embodiment of FIG. 9, the secondary authentication server 92 includes both a token generation module 91 and an authenticator 93 in accordance with the present invention. The mobile device 10 requests credentials from the primary authentication system 90. The primary authentication system 90 then contacts the secondary authentication server 92. The token generation module 91 generates a token 94, and sends it to the primary authentication system 90 in a message 96. The primary authentication system 90 transmits the token 94 to the mobile device 10, where it is stored. When the mobile device associates to the second network 14, it sends the token 94 to the secondary authentication server 92, which verifies the token at its authenticator 93, and grants the mobile device 10 access to the second network 14.

The embodiments described above are not intended to, in any way, limit the scope of the present invention. The token generation module functions and the authenticator functions can be distributed between the primary and secondary authentication systems, or other server, in any manner consistent with generating tokens for passing over a first network and receiving the tokens for authentication over a second network. It is contemplated that the generation of tokens, and their authentication, can occur on any server, or servers, associated with the first and/or the second networks. The tokens can be single use, or can be used for multiple access. One or more tokens can be provided to the mobile device, on demand or at any other time. Multiple tokens can be generated, for access to different networks, valid at different times, or otherwise differentiated.

The application software embodying the mobile device token handling functions and the AAA and network server functionality can be stored on any suitable computer-useable medium for execution by a microprocessor in the mobile communication device or server, such as CD-ROM, hard disk, read-only memory, random access memory, flash memory, Subscriber Identity Module (SIM) card. The application software can be written in any suitable programming language, such as C++.

As will be appreciated by those of skill in the art, the described methods and systems allow a token, or set of tokens, to be sent to a mobile device over a secure and trusted channel. A token can then be sent over another network, operating under a different protocol, to an authentication system, where its contents are verified and authorization to access the new network is generated. Except for transfer to the authentication system, the token does not need to be processed by the second network, and messaging back and forth between the new network and the AAA server or the mobile device is significantly reduced, in contrast to conventional authentication protocols, particularly challenge protocols, such as CHAP.

Effectively, the mobile device does not need to re-authenticate to the new network, saving significant time and complexity in signing on to the new network. Such savings are particularly advantageous for services, such as Voice over IP (VoIP), where lengthy authentication to the new service is clearly undesirable, and may adversely affect the quality of service and user's perception of the service. In addition, since the tokens provide the necessary information to transparently generate an ACCESS-ACCEPT message without requiring the user to re-authenticate to the new network, the user is not required to manage multiple usernames and passwords.

Since the token contents, including usernames and passwords, are encrypted, the present invention permits rapid authentication to a new network, and can permit rapid handoff between a more trusted and a less trusted network. The present invention also provides enhanced security by limiting the amount of vulnerable authentication messaging between the authentication system and any less trusted network. This means service providers can integrate inexpensive IEEE 802.11 access points into their systems, rather than investing in costly cellular infrastructure, without unduly compromising the security of information sent over the less secure link.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of authenticating a mobile communication device on a network, the method comprising:
   generating a set of tokens, each token of the set of tokens having a different expiry time;
   transmitting the set of tokens to the mobile communication device over a first network;
   receiving a request for access to a second network from the mobile communication device;
   receiving a first token of the set of tokens from the mobile communication device;
   verifying a user credential contained in the first token;
   authenticating the mobile communication device for access to the second network by verifying the one of the plurality of tokens;
   receiving a second token of the set of tokens from the mobile communication device, wherein the second token has a later expiry time than the first token;
   verifying a user credential contained in the second token; and
   authenticating the mobile communication device for access to the second network beyond the expiry of the first token until the expiry of the second token.

2. The method of claim 1, wherein providing the plurality of tokens to the mobile communication device comprises generating at least one of the plurality of tokens at the request of the mobile communication device.

3. The method of claim 1, wherein at least one of the plurality of tokens comprises a header and a token content and wherein providing the plurality of tokens to the mobile communication device further comprises encrypting the token contents.

4. The method of claim 3, wherein encrypting the token contents comprises employing a PKI method.

5. The method of claim 3, wherein authenticating the mobile communication device for access to the second network by verifying the token comprises decrypting the token contents.

6. The method of claim 3, wherein encrypting the token contents comprises applying a hash function to the token contents.

7. The method of claim 6, wherein the hash function is MD5 or SHA.

8. A communications system having authentication functions, the communications system comprising:
   at least one processor circuit configured and adapted to:
      provide a plurality of tokens to a mobile communication device over the communications network, the plurality of tokens having different expiry times;
      receive one of the plurality of tokens from the mobile communication device over a separate network, to verify a token contents, and to grant the mobile communication device access to the separate network based on the verification of the token contents; and
      receive a second token of the plurality of tokens from the mobile communication device, to verify a token contents of the second token, the second token having a later expiry time than the first token, and to grant the mobile communication device access to the separate network based on the verification of the token contents, beyond the expiry of the first token until the expiry of the second token.

9. The system of claim 8, wherein the token contents comprises a username and password for access to the second network.

10. The system of claim 8, wherein the at least one processor is further operable to receive a request from the mobile communication device.

11. The system of claim 8, wherein the at least one processor is further operable to encrypt the token contents.

12. The system of claim 11, wherein to encrypt the token contents, the token generation module is operable to employ a PKI method.

13. The system of claim 11, wherein the at least one processor is further operable to decrypt the token.

14. The system of claim 11, wherein the at least one processor is further operable to apply a hash function to the token contents.

15. A method for authenticating mobile communication device to a heterogeneous network, comprising:
   receiving a set of tokens at a mobile communication device over a first network to which a mobile communication device is authenticated, each token of the set of tokens having a different expiry time;
   sending a first token of the plurality of tokens from the mobile communication device to an authenticator over a second heterogeneous network;
   receiving authorization to access the second network from the authenticator based on a verification of contents of the one of the plurality of tokens;
   sending a second token of the plurality of tokens from the mobile communication device to the authenticator, wherein the second token has a later expiry time than the first token; and
   receiving authorization to access the second network from the authenticator, based on a verification of contents of the second token, beyond the expiry of the first token until the expiry of the second token.

16. The method of claim 15, the method further comprising: if authentication to the second network fails based on the first token, then sending a second token of the plurality to the authenticator.

* * * * *